United States Patent
Cooper

(10) Patent No.: US 7,252,901 B2
(45) Date of Patent: Aug. 7, 2007

(54) CONVERSION OF RAW CARBONACEOUS FUELS

(75) Inventor: John F. Cooper, Oakland, CA (US)

(73) Assignee: The Regents of the University of California, Oakland, CA (US)

(*) Notice: Subject to any disclaimer, the term of this patent is extended or adjusted under 35 U.S.C. 154(b) by 368 days.

(21) Appl. No.: 10/898,471

(22) Filed: Jul. 23, 2004

(65) Prior Publication Data
US 2006/0019133 A1 Jan. 26, 2006

(51) Int. Cl.
*H01M 8/14* (2006.01)
(52) U.S. Cl. .................................................. 429/16
(58) Field of Classification Search .................. 429/16, 429/103
See application file for complete search history.

(56) References Cited
U.S. PATENT DOCUMENTS
2004/0229109 A1* 11/2004 Cooper et al. ............... 429/40

OTHER PUBLICATIONS

N. Cherepy et al, "Direct Conversion of Carbon Fuels In A Molten Carbonate Fuel Cell", Journal of Electrochemical Society, Feb. 25, 2004.

R. Weaver et al, "Direct Electrochemical Generation of Electricity From Coal", Report May 16, 1977-Feb. 15, 1979, Menlo Park, CA.
J. Cooper et al, "Direct Carbon Conversion: Application To The Efficient Conversion Of Fossil Fuels To Electricity", Paper No. 50, Fall Meeting of the Electrochemical Society, Phoeniz AZ, Oct. 2000. In The Global Climate Change: a Coordinated Response, PV-2000-20, The Electrochemical Society LLNL Report UCRL-JC-140629 p. 1.
J. Cooper et al, "Direct Conversion of Coal and Coal-Derived Carbon in Fuel Cells", Second International Fuel Cell Conference: Science, Engineering and Technology, paper no. Fuel Cell 2004-2495, American Society of Mechanical Engineers, Jun. 2004.

* cited by examiner

*Primary Examiner*—Patrick Joseph Ryan
*Assistant Examiner*—Thomas H. Parsons
(74) *Attorney, Agent, or Firm*—Alan H. Thompson; Ann M. Lee; John H. Lee

(57) ABSTRACT

Three configurations for an electrochemical cell are utilized to generate electric power from the reaction of oxygen or air with porous plates or particulates of carbon, arranged such that waste heat from the electrochemical cells is allowed to flow upwards through a storage chamber or port containing raw carbonaceous fuel. These configurations allow combining the separate processes of devolatilization, pyrolysis and electrochemical conversion of carbon to electric power into a single unit process, fed with raw fuel and exhausting high BTU gases, electric power, and substantially pure $CO_2$ during operation.

15 Claims, 4 Drawing Sheets

CONVERSION OF RAW CARBONACEOUS FUELS

The United States Government has rights in this invention pursuant to Contract No. W-7405-ENG-48 between the United States Department of Energy and the University of California for the operation of Lawrence Livermore National Laboratory.

RELATED APPLICATIONS

This application is related to U.S. Pat. application Ser. No. 09/970,283 filed Sep. 27, 2001 entitled "Fuel Cell Apparatus and Method Thereof", now U.S. Pat. No. 6,815,105; U.S. patent application Ser. No. 10/170,879 filed Jun. 12, 2002 entitled "Tilted Fuel Cell Apparatus", now U.S. Pat. No. 6,878,479; and U.S. Provisional Patent Application Ser. No. 60/471,499 filed May 15, 2003 entitled "Carbon Fuel Particles Used in Direct Carbon Conversion Fuel Cells", which are herein incorporated by reference.

BACKGROUND

High temperature, molten electrolyte, electrochemical cells have been shown to be an efficient method of producing energy particularly when the fuel source is hydrogen gas. Carbon as a fuel source in electrochemical cells has been explored.

SUMMARY OF THE INVENTION

An aspect of the invention includes a process comprising: providing a high temperature molten salt electrolytic cell; providing a raw carbonaceous feed material; thermally decomposing said raw carbonaceous feed material to a carbon fuel; converting said carbon fuel to electric energy; wherein said conversion generates heat and said heat is used for said thermal decomposition.

DETAILED DESCRIPTION

Figure 1:
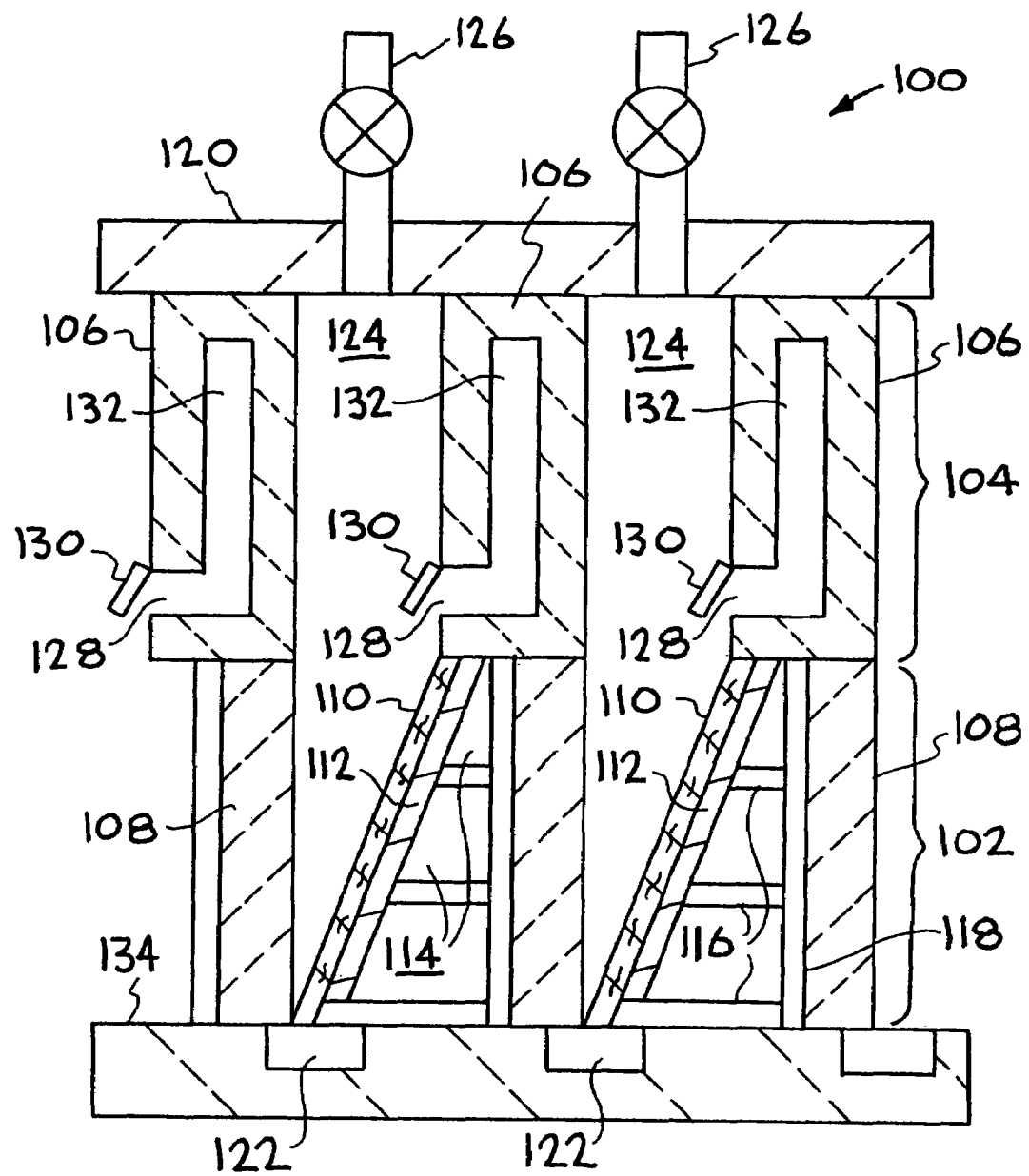
FIG. 1 illustrates an electric energy-producing cell effective for use with particulate carbon fuel.

High temperature, molten electrolyte, electrochemical cells have been shown to be an efficient method of producing electrical energy particularly when the fuel source is hydrogen gas. Carbon as an anodic fuel source in electrochemical cells has been explored, and advantages were found that are associated with higher conversion efficiency and more complete utilization of the carbon anode. U.S. Pat. application Ser. No. 09/970,283 filed Jun. 27, 2001 entitled "Fuel Cell Apparatus and Method Thereof", now U.S. Pat. No. 6,815,105, describes the use of particulate fuels in molten-salt media. U.S. Pat. application Ser. No. 10/170,879 filed Jun. 12, 2002 entitled "Tilted Fuel Cell Apparatus", now U.S. Pat. No. 6,878,479; discloses the use of angled cells to control wetting of the fuel by the molten salt. U.S. Provisional Patent Application Ser. No. 60/471,499 filed May 15, 2003 entitled "Carbon Fuel Particles Used in Direct Carbon Conversion Fuel Cells" describes methods of pre-treating particulate carbon fuel to promote wetting upon contact with molten salt. U.S. Pat. application Ser. No. 10/810,477 filed Mar. 26, 2004 entitled "Aerogel and Xerogel Composites for Use as Carbon Anodes" discloses the use of highly reactive forms of carbon (e.g., aerogels and xerogels) made by base-catalyzed condensation of phenol-like organic molecules with formaldehyde.

The use of carbon as an electrochemical fuel in fuel cells and batteries is well known in the literature (See John F. Cooper, "Direct Conversion of Coal and Coal-Derived Carbon in Fuel Cells," Proc. Second International Fuel Cell Conference: Science, Engineering and Technology, paper no. FUEL CELL 2004-2495, American Society of Mechanical Engineers, Jun. 14-16, 2004, Rochester N.Y.; N. Cherepy, K. Fiet, R. Krueger, A. Jankowski and J. F. Cooper, "Direct Conversion of Carbon Fuels into Electricity in a Molten Carbonate Fuel Cell," Paper accepted for publication in the J. Electrochem. Society, Feb. 25, 2004; Cooper, J. F., N. Cherepy, G. Berry, A. Pasternak, T. Surles, and Meyer Steinberg, 2001, "Direct Carbon Conversion: Application to the Efficient Conversion of Fossil Fuels to Electricity Proc. Global Warming Conference", PV 20-2000, The Electrochemical Society; April 2001.)

Carbon reacts as the anode in an electrochemical cell using oxygen (e.g., from air or from a pure oxygen source) as the cathodic reaction. Elevated temperatures are required to overcome the sluggishness of the carbon anode reaction, and molten salts such as mixed alkali carbonates are typically used as the electrolytic media at temperatures of 650-800° C. Any source of substantially pure carbon (i.e., ≧95%) may be used. High rates of substantially pure carbon are found with carbons produced by the thermal decomposition of hydrocarbons (e.g., fuel oil, petroleum coke, coal, and natural gas) at temperatures below about 1200° C., where the atomic structure of the resultant carbon chars are highly disordered (i.e., having domains of crystallinity less than 300 nm in size) and subject to lowered activation energy for anodic reactions.

The anodic half reaction of the carbon char resulting in carbon reaction in carbonate is:

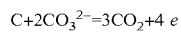
$$C + 2CO_3^{2-} = 3CO_2 + 4\ e$$

The cathodic half reaction in carbonate is oxygen reduction at an inert electrode (e.g., Ni/NiO) is typically:

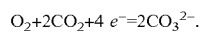
$$O_2 + 2CO_2 + 4\ e^- = 2CO_3^{2-}.$$

The net reaction is the same as the combustion of the char: $C + O_2 = CO_2$. However, the separation of carbon and oxygen by an electrolytically conducting medium (e.g., the molten mixed carbonate salt), allows electrons to be collected from a piece of metal in contact with the carbon, transferred through an external load to produce work or heat, and then transferred through a porous piece of metal in contact with the air to reduce the oxygen to oxide.

The net entropy change ($\Delta S$) for the reaction $C + O_2 = CO_2$ is very nearly zero. This means that substantially all of the enthalpy of the carbon/oxygen reaction can, in principle, be converted into useful electrical energy. The chemical potentials of both the carbon fuel and the carbon dioxide reaction are invariant with position in the electrochemical cell and do not change as the fuel is consumed and progressively converted to the reaction product, $CO_2$. For sufficiently uniform access to oxygen on the cathode side (e.g., caused by air flow at high rates, or means of inducing local turbulence), the rate of the electrochemical reaction measured by the local current density is uniform throughout the cell, the waste heat production is also uniform, and the potential of the reacting surface of the carbon adjacent to the current collector is also uniform. In practical terms, this "invariance of chemical potentials" of anode fuel and $CO_2$ product means that the EMF is substantially constant during discharge, and that substantially all of the carbon that is introduced into the cell may be converted to electric power in a single pass through the cell.

This combination of nearly zero entropy change and fixed chemical potentials of fuel and product, taken together with low voltage losses using carbon fuels derived from low-temperature pyrolysis reactions, combines to make possible the operation of carbon/air fuel cells and batteries at total conversion efficiencies of 80-90%, where efficiency is defined as the ratio of useful electrical work per mole of carbon divided by the heating value of the carbon fuel per mole of carbon ($\Delta H°_T$=94.05 kcal/mol) at temperatures T=300° to 1100° K. The 10-20% of the heating value of the fuel that is not converted to electrical energy is evolved within the electrochemical cell as heat.

Use of Economical Raw Carbonaceous Feed Material

The ability to convert elemental carbon, or substantially pure carbon chars, to electric power has extraordinary potential impact on the production of electricity. To realize such impact, it is necessary to convert raw carbonaceous resources to carbon chars having a high degree of disorder and a high specific gravity and electronic conductivity. Excellent results were found with thermally devolatilized coal for coal plates and cylinders having density of 0.8-1.2 g/cm$^3$ and electrical resistively of 0.008-0.036 ohm-cm$^{-1}$. (See Weaver R. D; S.C. Leach, A. E. Bayce and L. Nanis, 1979, Direct Electrochemical Generation of Electricity from Coal, Report May 16, 1977-Feb. 15; SRI, Menlo Park, Calif. 94025; SAN-0115/105-1.)

Ways to use the waste heat of the cell (10-20% of the total heat of combustion of the carbon or char) to process raw coal, petroleum coke, pitch or biomass into useful carbon fuel by the process of thermal devolatilization and decomposition (or pyrolysis) are disclosed herein. Specifically, the juxtaposition of the electrochemical cell relative to the feed chamber such that heat flows from cell to and through feed chamber to effect de-volatilization and pyrolysis using only the waste heat of the cell. Elimination of the fuel preparation stages and associated costs are accomplished by accepting raw carbonaceous feed materials and proceeding by means of a single continuous unit process to devolatilize, pyrolyze and electrochemically convert the carbon. A key physical phenomenon is the fact that the time scales for devolatilization and pyrolysis are about one thousand times less than that of electrochemical conversion. Thus, loss of fuel by reaction of the percolating $CO_2$ during devolatilization is negligible compared with the net conversion of carbon to $CO_2$.

A basic electrochemical cell that combines the separate processes of devolatilization, pyrolysis and electrochemical conversion of carbon to electric power into a single unit process comprises: a channel shaped heat exchanger, a rigid bipolar transfer plate supporting the heat exchanger, and a porous ceramic matrix separating the anode from a conventional air electrode. Raw carbonaceous feed material is fed into the cell and high BTU gases, electric power, and substantially pure $CO_2$ exit the cell.

As used herein, raw carbonaceous material is defined as coal, petroleum coke, biomass or pitch. As used herein, carbon fuel is defined as the carbon product of thermally decomposed raw carbonaceous material. FIG. 1 shows an embodiment that converts raw carbonaceous feed material first to carbon fuel and then to electric power. This embodiment is called a "bipolar electrochemical cell assembly." The bipolar electrochemical cell assembly avoids the high electrical losses that would be associated with the extraction of electrical current all the way from the cell to an external conductor or buss and back into an adjacent cell. Referring to FIG. 1, the bipolar electrochemical cell assembly 100 comprises two fundamental compartments: at least one electrochemical cell 102 and at least one raw carbonaceous feed compartment 104. Raw carbonaceous feed compartment 104 is bounded by two heat exchangers 106. The heat exchangers have a $CO_2$ flow channel 132 with an entry point 128. Heat exchangers 106 can be rectangular in shape and made of a corrosion resistant non-electronically or electrolytically conductive material such as dense alumina, magnesia, or zirconia. Electrochemical cell 102 is bounded on one surface by a bipolar feed through transfer plate 108 and on the other surface by a porous ceramic matrix 110. Bipolar feed through transfer plate 108 serves to transfer electrons collected from the reaction of carbon fuel to the adjacent cell. Bipolar feed through transfer plate 108 comprises materials (e.g., dense highly-graphitized carbon) that do not react with the carbon fuel, $CO_2$, or molten carbonate electrolytes. Porous ceramic matrix 110 serves to separate particulate carbon fuel from an electronically conductive air electrode 112 (cell cathode). Porous ceramic matrix 110 comprises alumina felt or fabric, zirconia felt or fabric, magnesia felt or fabric, or other similar material. Air electrode 112 is an electronically conductive material that has been catalyzed for the reduction of oxygen molecules in the presence of carbon dioxide to carbonate ions. Air electrode 112 is typically a porous sintered mass of nickel particles of total thickness 1 mm that has been catalyzed by (1) oxidation in air to form a continuous NiO film over the surface of the individual Ni particles, followed by (2) permeation with lithium ions ($Li^+$) that alter the atomic-level structure of the NiO rendering it an electronically conductive material that has been catalyzed for the reduction of oxygen molecules in the presence of carbon dioxide to carbonate ions. Gasses containing oxygen (e.g., air, pure oxygen, and oxygen in neutral carrier gasses) are mixed with carbon dioxide typically in the ratio of 2 moles $CO_2$: 1 mole $O_2$ and forced to flow through a plurality of gas flow channels 114 between a plurality of conductive bridges 116. Electrons are transferred from the bipolar transfer plate of one cell to the air electrode of the adjacent cell through conductive bridges 116 via a conductive plate 118 that is bonded to the surface of the bipolar transfer plate. The conductive plate comprises a material not oxidized at the operating temperature of the cell. This arrangement allows electrons to flow in a substantially horizontal direction from one cell to another in series electrical connection.

In operation, a lid 120 is removed from the cell, the circuit (not shown) connecting the cells is broken externally to the bipolar assembly, and all air flow is shut off to air flow channels 114. It is important to allow all the oxygen to be removed from the air flow channels by either replacement with an inert gas or by merely exhausting the stored quantity of oxygen in the cells by electrochemical reaction after the air flow has been shut off leaving substantially pure nitrogen. After removal of lid 120, a plurality of feed chambers 124 contained in raw carbonaceous feed compartments 104 are filled with raw carbonaceous feed material, and the lid is replaced. Shutting off the air flow and exhausting the inventory of oxygen with air flow channels 114 prevents a potentially catastrophic shorting of the cell which can occur if carbon fuel in feed chamber 124 inadvertently bridges over heat exchanger 106 and makes electronic contact with the carbon fuel in an adjacent feed chamber.

The carbon entering the cell is initially charged with mixed alkali carbonate salts (e.g., $(Li_a,K_b,Na_c)_2CO_2$, where a+b+c=1) that, when melted, form the electrolytic conductor necessary for discharge of the cell. Excess molten salt flows downward through the bed and through the adjacent separator into a plurality of sumps 122, or is driven by capillary forces backwards from sumps 122 into porous ceramic matrix 110 or feed chamber 124. Sufficient molten salt is maintained in contact with the carbon fuel, such that is coats the carbon particles with a thin film, to complete the electrolytic circuit between a cathode (i.e., air electrode 112), a separator (i.e., porous ceramic matrix 110), and an anode (i.e., the carbon fuel), and the adjacent bipolar feed through transfer plate.

The bipolar feed through transfer plate is non reactive in the electrochemical environment of the feed chamber 124, i.e., does not dissolve or react at the operating temperature and under the extreme reducing conditions of the anode. The bipolar feed through transfer plate also does not react substantially with the carbon, molten salt, carbon dioxide or carbon monoxide to the extent present in feed chamber 124. On the air electrode side, bipolar feed through transfer plate 108 does not react with ambient oxygen or $CO_2$. Bipolar feed through transfer plate 108 comprises highly graphitized carbon plates (subject to temperatures of up to 3000° C.) that are unreactive eletrochemically under conditions where reactive turbostratic carbon fuels are highly reactive. This unreactivity of the graphitized plates may be enhanced further with the use of glassy or vitreous carbon coatings, and pores at the graphite surfaces may be infused with vitreous carbon. On the air electrode side, the graphite may be clad with a conductive alloy such as stainless steel 316L, Inconel® 600, pure Nickel, silver, etc. In place of graphitized carbon, a plate material (such as stainless steel or mild steel) can be plated or clad with a noble metal or noble metal alloy (e.g., silver, gold, platinum or palladium, or alloys thereof) to achieve the same chemical resistance.

A Plurality of exhaust ports 126 are open to allow the exit of gases during pyrolysis and devolatization. During electrochemical conversion of the carbon fuel, the exhaust ports are closed so that the $CO_2$ byproduct is exhausted into a $CO_2$ flow channel 132 of heat exchanger 106 through an entry point 128. Entry point 128 is protected from filling up or clogging with particles of carbon fuel by a louver 130. The $CO_2$ exits $CO_2$ flow channels 132 through an exhaust port (not shown). The plurality of heat exchangers serve the dual purpose of (1) extracting waste heat (i.e., heat that is not used for devolatization or pyrolysis reactions) from the cell by entrainment in a cooling gas (e.g., $CO_2$) that is allowed to flow through $CO_2$ flow channels 132, and (2) acting as a conduit for the exhaustion of $CO_2$ product gasses. A ceramic base 134 supports the apparatus.

Another embodiment of the invention utilizes a plurality of rigid but porous carbon plates having a solid fraction in the range of 20-80%, typically about 40-60% as the raw carbonaceous feed material. A single carbon plate is consumed to produce electricity by forcing the current to flow substantially at the carbon/separator interface. Additional carbon plates can be introduced into the overlying feed chamber in the form of rectangular plates about 2 cm thick. A new plate feeds into the cell from the feed chamber as the existing carbon plate in the cell is consumed. A rectangular block entering the cell from the overlying feed chamber will gradually conform to the shape of the cell as the carbon adjacent to the separator (and only the carbon adjacent to the separator) is progressively converted from solid carbon to gaseous $CO_2$.

Figure 2:
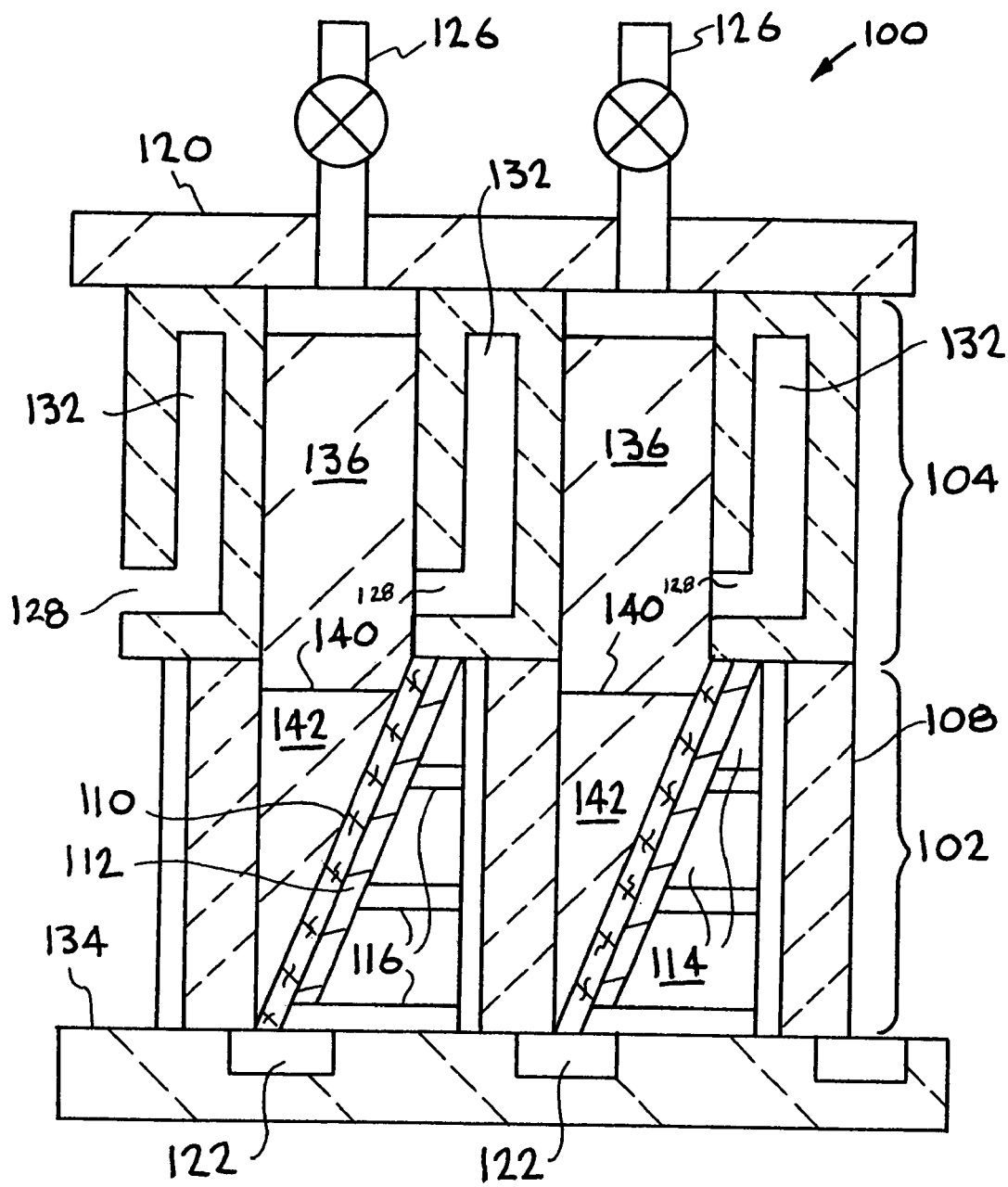
FIG. 2 illustrates an electric energy-producing cell effective for use with a wedge-shaped rigid block of carbon fuel.

Gasses produced during the devolatilization and pyrolysis stages exit through a plurality of exhaust ports 126. Referring to FIG. 2, the gaseous $CO_2$ produced during discharge of the cell flows around an anode carbon block 136 in the cell between the carbon block and heat exchanger 106 and enters the $CO_2$ flow channel 132 through entry point 128. During discharge, ports 126 are closed. There is no need for a louver to prevent clogging of $CO_2$ flow channel 132. A junction 140 exists where a partially consumed wedge-shaped block 142 meets a partially fed rectangular-shaped block 136. The flow of current at junction 140 is shared by the two carbon blocks which are not necessarily in perfect electronic contact.

Regardless of whether the cell consumes particles or plates of raw carbonaceous feed material, the efficiency of the cell is dependent upon the fact that the carbon fuel that undergoes oxidation is subject to a large excess potential of about 0.1 to 0.2 V that subtracts from the open circuit potential. This allows (1) a pure carbon dioxide byproduct to be produced and (2) prevents the back reaction of carbon dioxide with carbon according to the Boudouard reaction that would cut efficiency in half. This excess potential (or "overpotential") can be achieved by making the anodes relatively thin, such that no part of the anode is exposed to $CO_2$ flow while being polarized to a degree less than 0.1 V.

Figure 3:
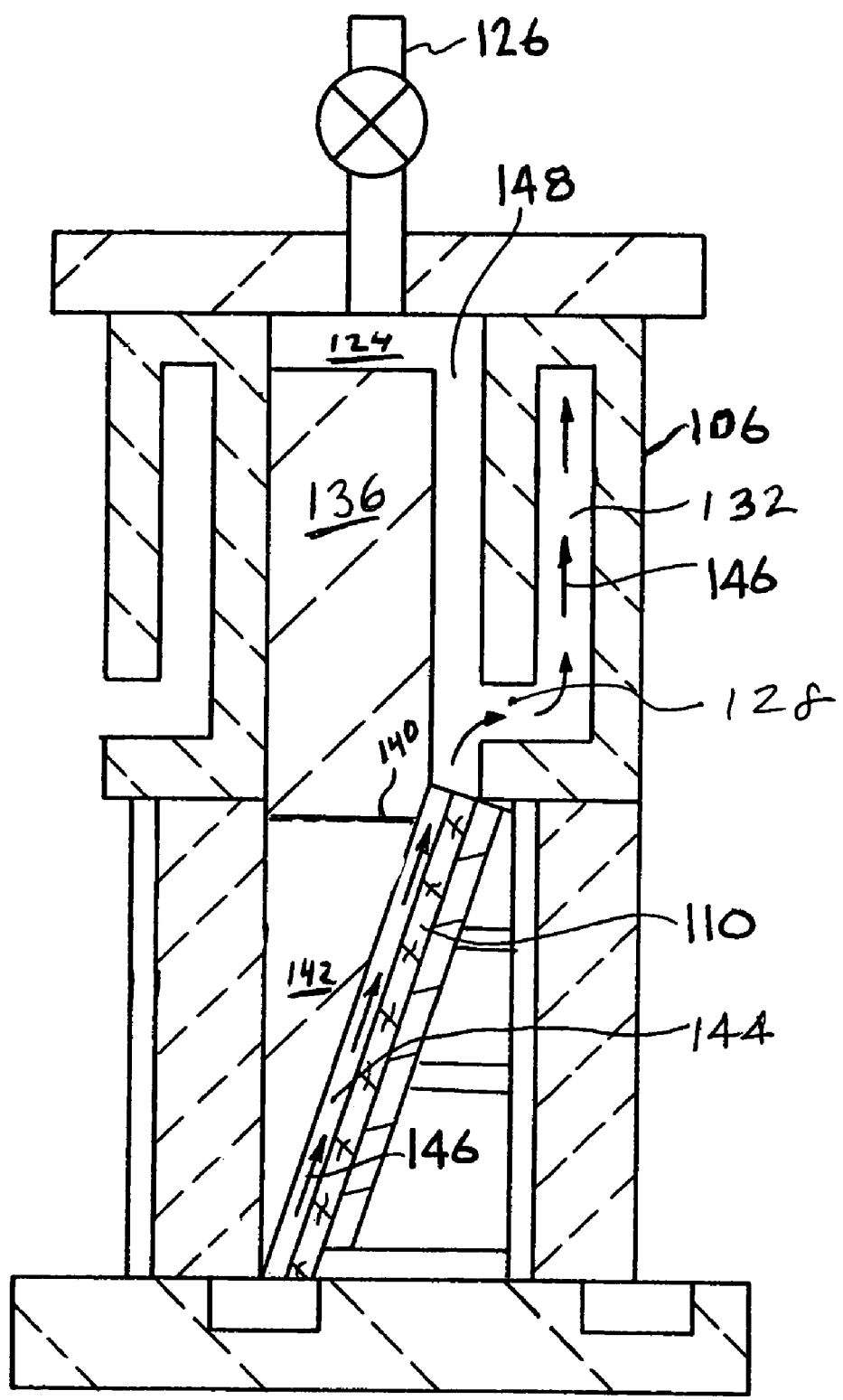
FIG. 3 illustrates an electric energy-producing cell with a gas-diffusion chamber.

An embodiment is disclosed herein that achieves an overpotential by creating a porous environment for the evolution of $CO_2$ as an alternative to using thin anodes. Referring to FIG. 3, providing a highly porous, ceramic barrier layer, i.e, a gas diffusion plate 144, between the porous ceramic matrix 110 and the partially consumed wedge-shaped carbon anode block 142 prevents the direct contact of $CO_2$ evolved with unreacted carbon fuel. This diffusion plate provides a route (shown by arrows 146) for the flow of carbon dioxide from the region near separator 110 to entry point 128 and then into a $CO_2$ flow channel 132. Transport of the $CO_2$ out of the cell occurs through exhaust ports (not shown) in $CO_2$ flow channel 132 and is, thus, enabled with minimal diffusion through the electrochemical cell. Gas diffusion plate 144 is comprised of a porous ceramic with open continuous pores, a pore volume fraction of 30-50%, and a median pore size of 30-300 micrometers. Exhaust port 126 remains closed during power production. Any gas between anode block 136 and heat exchanger 106 is trapped in a cul-de-sac 148. The trapped gas is immobile, and its reaction with the raw carbonaceous feed material goes to completion with minimal loss to corrosion. The ceramic may be composed of lithium aluminate, magnesium oxide, aluminum oxide, zirconium oxide or other non-electrically conducting oxides that are un-reactive in mixed carbonate electrolytes, but wetted by the carbonate electrolytes.

Method of Operation

Heat is transferred from the electrochemical cell upwards into and through the raw carbonaceous feed compartment. The raw carbonaceous feed compartment is heated by a combination of thermal conduction and convection in associated gases. Three stages are defined.

The first stage of operation. The feed chamber contained within the raw carbonaceous feed compartment is partially or completely filled with a raw carbonaceous feed material. Carbon dioxide from the cell reaction flows upwards at the operating temperature of the cell and transfers heat to the raw carbonaceous feed material in the feed chamber causing it to devolatilize. Devolatization is the vaporization of any absorbed or adsorbed gases or moisture or hydrocarbon materials in the raw carbonaceous feed material. Hydrocarbon materials include methane, ethane, propane, isomers thereof, oils, waxes, tars, and the various volatile impurities that contain sulfur or nitrogen compounds. These materials are carried upwards through the feed chamber and exit through a plurality of exhaust ports 126 having valves. These hydrocarbon materials represent high or medium BTU gases that may be burned to provide heat for boilers or turbines, or reformed in the presence of additional heat and steam to form hydrogen gas. The time required for the completion of devolatization is very short (on the order of 1-10 minutes).

The second stage of operation. Any gasses remaining from the devolatilization are entrained in the $CO_2$ stream. The thermal decomposition of the hydrocarbon residuals left after the devolatilization described in the first stage produce gases that are then entrained in the $CO_2$ flow. Gases entrained in the $CO_2$ stream can include hydrocarbons, hydrogen, and hydrogen sulfide. This process reduces the hydrocarbon material from the first stage to substantially pure carbon chars of sufficient conductivity to serve as efficient carbon fuels. The second stage has been exhaustively studied and reported in coal pyrolysis literature. It is substantially complete after 100-1000 minutes. For most bituminous coal ranks, it is usually entirely complete in 250 minutes. (See J. B. Howard, "Fundamentals of Coal Pyrolysis and Hydropyrolysis," chapter in *The Chemistry of Coal Utilization*, ed Elliott, 1981, John Wiley and Sons NY.)

The third stage of operation. Electrochemical reactions of the cell convert the carbon fuel in the cell to electrical energy and a substantially pure $CO_2$ byproduct. Unlike the first two stages, the conversion of carbon to electrical energy and $CO_2$ is very slow. For an anode chamber having an average thickness (e.g., s=2 cm) operating at a current density of i=0.1 A/cm$^2$, and having a density (average, counting voids) of 1 g/cm$^3$, the reaction time is given by t=nFds/Mi=514,000 s. Here, M is the atomic weight of carbon, 12 g/g-mole; F is the Faraday constant (96500 coulombs/equivalent); and n is the number of equivalents of carbon per mole of carbon (n=4). Since the time for electrochemical conversion is very large compared to the times for devolatilization and pyrolysis, these processes, though sequential, may be confined to distinct periods of operation. In the first and second stages, exhaust ports 126 are open to allow the exit of gases. In the third stage, the exhaust ports are closed so that the $CO_2$ byproduct is exhausted into the heat exchanger through a plurality of $CO_2$ entry points 128 protected from filling up or clogging with particles of carbon fuel by a plurality of louvers 130. Carbon dioxide will react with reactive carbon according to the Boudouard reaction, $C+CO_2=2CO$, a reaction which is nearly complete above about 700° C., causing a substantial loss of electrical current per mole of carbon consumed. Electrical current is reduced by a factor of 2 for a reaction product of pure CO. rather than pure $CO_2$. If the electrochemical cell is saturated with $CO_2$ during devolatilization and pyrolysis, the amount of Boudouard reaction that occurs during the relatively short time required for the devolatiuization and pyrolysis reactions is very small. Thus, the corresponding losses in efficiency will also be small: the loss due to CO generation will be limited to about 0.1%, which is a negligible loss to efficiency A plurality of heat exchangers 106 serve the dual purpose of extracting waste heat (i.e., heat that is not used for devolatilization or pyrolysis reactions) from the cell by entrainment in a cooling gas (e.g., $CO_2$), and acting as a conduit for the exhaustion of $CO_2$ product gasses. By providing an exhaust route for the $CO_2$ that is adjacent to the polarized carbon in the cell, the percolation of $CO_2$ through the raw carbonaceous feed material is avoided, eliminating the side reactions that form CO. Carbon dioxide in the presence of polarized carbon particles having a surface polarization of between 0.1 and 0.2 V (i.e., the carbon fuel generated by depolarization and pyrolysis reactions) will not react to produce CO because of kinetic factors. (See John F. Cooper, "Direct Conversion of Coal and Coal-Derived Carbon in Fuel Cells," Proc. Second International Fuel Cell Conference: Science, Engineering and Technology, paper no. FUELCELL2004-2495, American Society of Mechanical Engineers, Jun. 14-16, 2004, Rochester N.Y.; N. Cherepy, K. Fiet, R. Krueger, A. Jankowski and J. F. Cooper, "Direct Conversion of Carbon Fuels into Electricity in a Molten Carbonate Fuel Cell," Paper accepted for publication in the J. Electrochem. Society, Feb. 25, 2004; Cooper, J. F., N. Cherepy, G. Berry, A. Pasternak, T. Surles, and Meyer Steinberg, 2001, Direct Carbon Conversion: Application to the Efficient Conversion of Fossil Fuels to Electricity Proc. Global Warming Conference, PV 20-2000, The Electrochemical Society; April 2001.)

Figure 4:
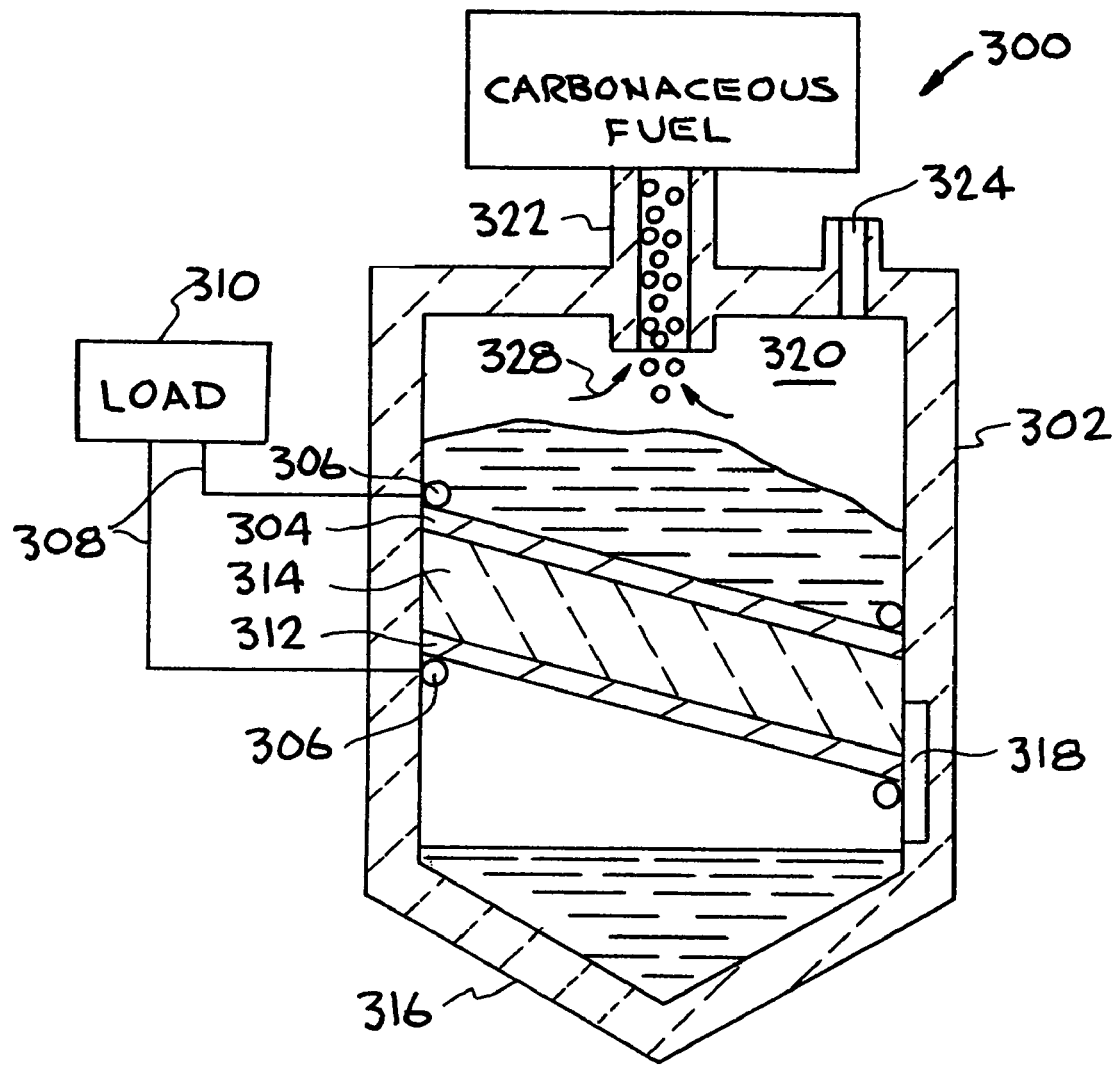
FIG. 4 illustrates an electric energy-producing cell.

A cross-sectional diagram of another embodiment is illustrated in FIG. 4. FIG. 4 illustrates a cell 300 having cell walls 302 comprising an unreactive ceramic material such as dense alumina, magnesia, or zirconia, in which the current from an anode current collector 304 is collected at a buss bar or ring 306 through an external circuit 308 and consumed through a load 310 before returning to a cathode 312. Cathode 312 is separated from anode current collector 304 by a porous ceramic separator 314. A sump 316 collects and stores any excess molten salt. Sump 316 communicates by capillary action with the porous ceramic separator through a connecting port 318 which contains a wick. Raw carbonaceous fuel is fed into an electrochemical cell anode chamber 320 through an entrance port 322 where devolatilization and pyrolysis reactions occur. The bulk of the $CO_2$ is allowed to flow through the exhaust port 324. Entrance port 322 has a volume that allows sufficient time for the completion of both devolatilization and pyrolysis reactions. Only the products resulting from the devolatilization and pyrolysis steps (i.e., the carbon fuel) are allowed to exit port 322 through exit 328 through a plurality of valved ports (not shown) into anode chamber 320 for subsequent electrochemical conversion. The volume of raw carbonaceous feed material and carbon fuel in the cell is selected such that the bulk of the carbon fuel in the cell is subject to continuous polarization at levels of 0.1-0.2 V and thus protected against Boudouard corrosion.

Experimental Results

Results with chemically de-ashed bituminous coal particles. A carbon char fuel was prepared from a raw coal sample that had been produced by (grinding) certain non-agglomerating bituminous coal materials into fine grains (10-100 micrometers size) followed by treatment with caustic to remove alumino-silicates and other metal oxide inclusions collectively called "ash." The particles of de-ashed coal contain a negligible amount of ash (0.17-0.27%) but retain a thermal heating value of 15100 BTU/lb. The cost of the process (including raw coal) is equivalent to $3/Gj thermal value, making this a favorable economic compromise between zero ash content and raw coal (1-2 $/GJ).

The particulate, de-ashed raw coal sample was first treated in molten carbonate for less than 45 minutes at a temperature of 750° C.; cooled; ground to a fine powder; and then introduced into an electrochemical cell. Non-agglomerating coals represent a certain fraction of natural sub-bituminous coal that has surface functional groups that allow thermal decomposition to gaseous products without going through a tar-forming or sticky phase. Such coal is ideal for this kind of cell, as it will not clog or stick together in the feed chamber.

Many kinds of bituminous coal may be converted to non-agglomerating particulates by processes that produce ester functional groups on the surface of the coal. Such processes include oxidation in gasses containing a few percent oxygen or treatment with aqueous phase oxidants. (See J. B. Howard, "Fundamentals of Coal Pyrolysis and Hydropyrolysis," chapter in *The Chemistry of Coal Utilization*, ed Elliott, 1981, John Wiley and Sons NY.)

Throughout this application, various publications, patents, and published patent applications are referred. The disclosures of the publications, patents, and published patent specifications referenced in this application are hereby incorporated by reference into the present disclosure to more fully describe the state of the art to which this invention pertains.

All numbers expressing quantities of ingredients, constituents, reaction conditions, and so forth used in the specification and claims are to be understood as being modified in all instances by the term "about". Notwithstanding that the numerical ranges and parameters setting forth the broad scope of the subject matter presented herein are approximations, the numerical values set forth in the specific examples are reported as precisely as possible. Any numerical value, however, inherently contain certain errors necessarily resulting from the standard deviation found in their respective testing measurements.

While various materials, parameters, operational sequences, etc. have been described to exemplify and teach the principles of this invention, such are not intended to be limited. Modifications and changes may become apparent to those skilled in the art; and it is intended that the invention be limited only by the scope of the appended claims.

The invention claimed is:

1. A process comprising:
   providing a high temperature molten salt electrolytic cell;
   providing a raw carbonaceous feed material;
   thermally decomposing said raw carbonaceous feed material to a carbon fuel;
   converting said carbon fuel in said electrolytic cell to electric energy and heat;
   wherein said heat is transferred to said raw carbonaceous feed material for said thermal decomposition or to a carbon fuel.

2. The process recited in claim 1, wherein said process further comprises a first compartment containing said raw carbonaceous feed material or a carbon fuel adjacent a second compartment comprising said electrolytic cell.

3. The process recited in claim 2, wherein carbon fuel contained in said first compartment is transferred to said electrolytic cell.

4. The process recited in claim 2, wherein said heat is transferred by thermal conduction, convection of hot gases, or combinations thereof.

5. The process recited in claim 1, wherein said raw carbonaceous feed material is in the form of a rigid carbon block or a plurality of carbon particulates.

6. The process recited in claim 1, wherein said raw carbonaceous feed material is (1) in the form of a rigid carbon block conforming to the shape of said second compartment, or (2) a plurality of carbon particulates.

7. A process comprising:
   providing at least a first and second high temperature molten salt electrolytic cell;
   providing a raw carbonaceous feed material to said first cell and to said second cell;
   thermally decomposing said raw carbonaceous feed material to produce a carbon fuel;
   converting said carbon fuel to electric energy and heat in said first cell;
   serially transferring at least a portion of said electric energy from said first cell to said second cell; and
   wherein said heat is used for said thermal decomposition in said first cell.

8. The process recited in claim 7, wherein said process exhausts substantially pure carbon dioxide.

9. The process recited in claim 8, wherein said carbon dioxide is exhausted from said first cell to said raw carbonaceous material by a route adjacent said first cell.

10. The process recited in claim 7, wherein the raw carbonaceous feed material is in the form of a rigid carbon block or a plurality of carbon particulates.

11. The process recited in claim 7, wherein said thermal decomposition further produces medium or high BTU gases.

12. A process comprising:
   providing a high temperature molten salt electrolytic cell in a first compartment;
   providing a raw carbonaceous feed material in a second compartment located above said first compartment;
   thermally decomposing said raw carbonaceous feed material to a carbon fuel in said second compartment;
   converting said carbon fuel in said electrolytic cell to electric energy and heat; wherein said heat is transferred to said raw carbonaceous feed material for said thermal decomposition.

13. The process recited in claim 12, wherein said heat transferred from said cell is sufficient to produce at least a portion of devolatilization of said raw carbonaceous material during said thermal decomposition.

14. The process recited in claim 13, wherein at least a portion of said carbon fuel is converted to carbon dioxide that is exhausted from said first compartment and returned to said second compartment by a route having minimal contact with said first compartment.

15. The process recited in claim 14, wherein at least a portion of said electric energy comprising electrons is serially transferred in a substantially horizontal direction from said cell to an adjacent molten salt electrolytic cell.

* * * * *